(12) United States Patent
Hammer

(10) Patent No.: US 7,036,026 B2
(45) Date of Patent: Apr. 25, 2006

(54) RESETTING TIME-OUT FOR AUTOMATIC POWER-OFF OF A NOTEBOOK COMPUTER UPON PLACEMENT OF A STYLUS IN A STORAGE LOCATION

(75) Inventor: Per Sigurd Hammer, Clydebank (GB)

(73) Assignee: Lenovo (Singapore)Pte Ltd., Singapore (SG)

( * ) Notice: Subject to any disclaimer, the term of this patent is extended or adjusted under 35 U.S.C. 154(b) by 413 days.

(21) Appl. No.: 10/248,065

(22) Filed: Dec. 13, 2002

(65) Prior Publication Data

US 2003/0172311 A1    Sep. 11, 2003

(30) Foreign Application Priority Data

Dec. 27, 2001  (GB) .................................... 0130970

(51) Int. Cl.
*G06F 1/26* (2006.01)
*G09G 5/00* (2006.01)

(52) U.S. Cl. ........................ 713/300; 713/323; 345/179

(58) Field of Classification Search ................ 713/300, 713/310, 320, 321, 323; 345/179
See application file for complete search history.

(56) References Cited

U.S. PATENT DOCUMENTS

| | | | |
|---|---|---|---|
| 6,233,464 B1* | 5/2001 | Chmaytelli | 455/556.2 |
| 6,457,134 B1* | 9/2002 | Lemke et al. | 713/323 |
| 6,473,076 B1* | 10/2002 | Thompson et al. | 345/179 |
| 6,681,333 B1* | 1/2004 | Cho | 713/300 |
| 2001/0044908 A1* | 11/2001 | Siu | 713/323 |

FOREIGN PATENT DOCUMENTS

JP          06095786 A  *  4/1994

* cited by examiner

*Primary Examiner*—Thomas Lee
*Assistant Examiner*—Suresh K Suryawanshi
(74) *Attorney, Agent, or Firm*—Carlos Munoz-Bustamante

(57) ABSTRACT

A notebook computer has a display screen adapted to interact with a stylus and a storage location for storing the stylus when the stylus is not in use. The notebook computer also has a power control means for powering on the notebook computer upon removal of the stylus from the storage location and for powering off the notebook computer upon replacement of the stylus into the storage location. The power control means resets a time-out for automatic power-off to the notebook computer to a default value upon replacement of the stylus into the storage location. The power control means also increases a time-out for automatic power-off of the notebook computer whilst the stylus is removed from the storage location. The notebook computer may also include a power on-off switch and the power control means may also power on the notebook computer when the power on-off switch is operated. The power on-off switch when operated to power on the notebook computer may also release the stylus from the storage location.

2 Claims, 2 Drawing Sheets

RESETTING TIME-OUT FOR AUTOMATIC POWER-OFF OF A NOTEBOOK COMPUTER UPON PLACEMENT OF A STYLUS IN A STORAGE LOCATION

FIELD OF THE INVENTION

The invention relates to notebook computers and particularly to notebook computers of the type using a stylus for interacting with a display screen. More particularly the invention relates to improved ergonomics for such notebook computers.

BACKGROUND OF THE INVENTION

GB Patent Application 2324135 discloses a sliding storage arrangement for a stylus for a Personal Digital Assistant (PDA) in which a main shell locates inside an outer shell. A spring and plunger are used to bias the stylus to a fully extended position.

European Patent Application 0 655 674 discloses a data input unit including a sensor pad which detects writing on its surface. The unit does not have a power switch but senses when the tip of the pen is placed close to the sensor pad. The system switches to a stand-by mode when the pen is not in close proximity to the sensor pad.

It would be desirable to provide a notebook computer which was powered on without the user needing to locate the tip of the stylus close to the sensor pad of a display. This would improve the usability of such a notebook computer.

BRIEF SUMMARY OF THE INVENTION

Accordingly the invention provides a notebook computer comprising a display screen adapted to interface with a stylus and a storage location for storing the stylus when the stylus is note in use. The invention is characterized in that the notebook computer further comprises power control means for powering on the notebook computer upon removal of the stylus from the storage location and for powering off the notebook computer upon replacement of the stylus into the storage location. Removal of the stylus typically means that the user is likely to start using the notebook computer and so usability is improved by having the notebook computer be powered on response to the user's action in removing the stylus.

In a preferred embodiment the power control means resets a time out for automatic power off of the notebook computer to a default value upon replacement of the stylus into the storage location. Replacement of the stylus typically means that the user has finished using the notebook computer, although the user may still be viewing information displayed on the display screen. Usability is improved by having replacement of the stylus initiate a power off sequence, thus avoiding a separate user action. Usability is further improved by having the power off sequence include a time out value allowing the user to finish viewing information displayed on the display screen.

In a further preferred embodiment, the power control means increases a time out for automatic power off of the notebook computer whilst the stylus is removed from eh storage location. The stylus being removed from the storage location indicates that the user is still using the notebook computer and so it is less desirable that the notebook computer powers off after a short time.

In another embodiment, the notebook computer further comprises a power on off switch and the power control means also powers on the notebook computer when the power on off switch is operated. This has the advantage that an alternative is available to a user who merely wishes to see the display of the notebook computer without interacting by using the stylus.

Preferably, the power on off switch when operated to power on the notebook computer also releases the stylus from the storage location. This has the advantage that it is immediately obvious to a new user where the stylus is located once the device is powered on.

BRIEF DESCRIPTION OF THE SEVERAL VIEWS OF THE DRAWINGS

The invention will now be described, by way of example, only with reference to the accompanying drawings in which.

DETAILED DESCRIPTION OF THE INVENTION

Figure 1:
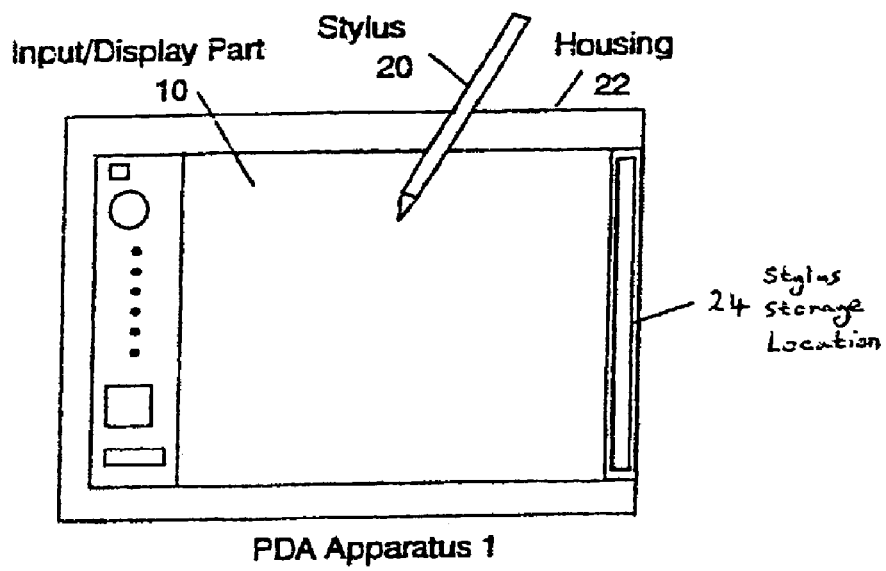
FIG. 1 shows a PDA in which the present invention is implemented.

FIG. 1 shows a PDA apparatus 1 in which the present invention is implemented. PDA apparatus 1 is a notebook computer which may also be known as a pen computer or a notepad computer and is provided with an input/output display portion 10 on the upper surface of a small housing 22, intended to be held in the hand. Also provided is a stylus 20 which co-operates with the input/output display portion 10 for the entry of the data and handwritten characters. When note in use, the stylus 20 is stored in a stylus storage location 24.

Figure 2:
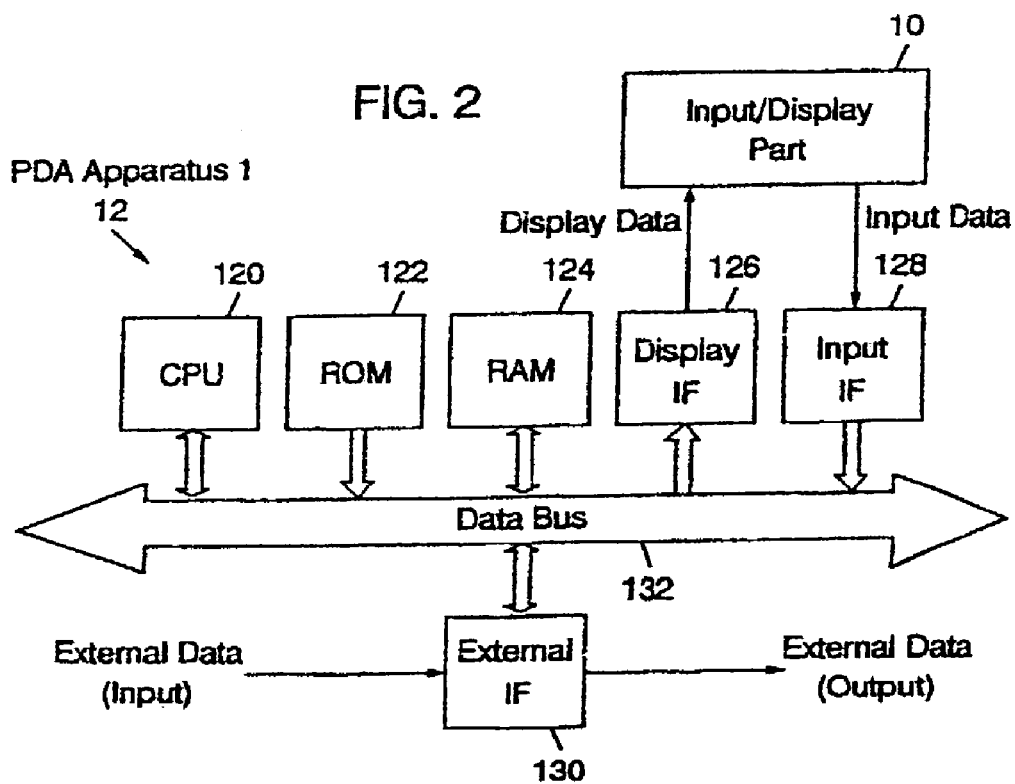
FIG. 2 shows a block diagram of a PDA of the present invention.

FIG. 2 shows a block diagram of the PDA apparatus of FIG. 1. PDA apparatus 1 comprises an input/display part 10 and a data processing part 12. The data processor part 12 comprises a microprocessor 120, a ROM, 122 A RAM 124, a display interface circuit (display IF) 126, an input interface circuit (input IF) 128 and an external interface circuit (external IF) 130 connected via a data bus 132. In the data processing part 12, the microprocessor 120, comprising a general purpose microprocessor and peripheral circuits thereof, for example, executes a character data input program, displays various graphic images on the display device 100 (FIG. 3) and recognizes and edits hand written character input to the input device 102 (FIG. 3) for generating character data.

Figure 3:
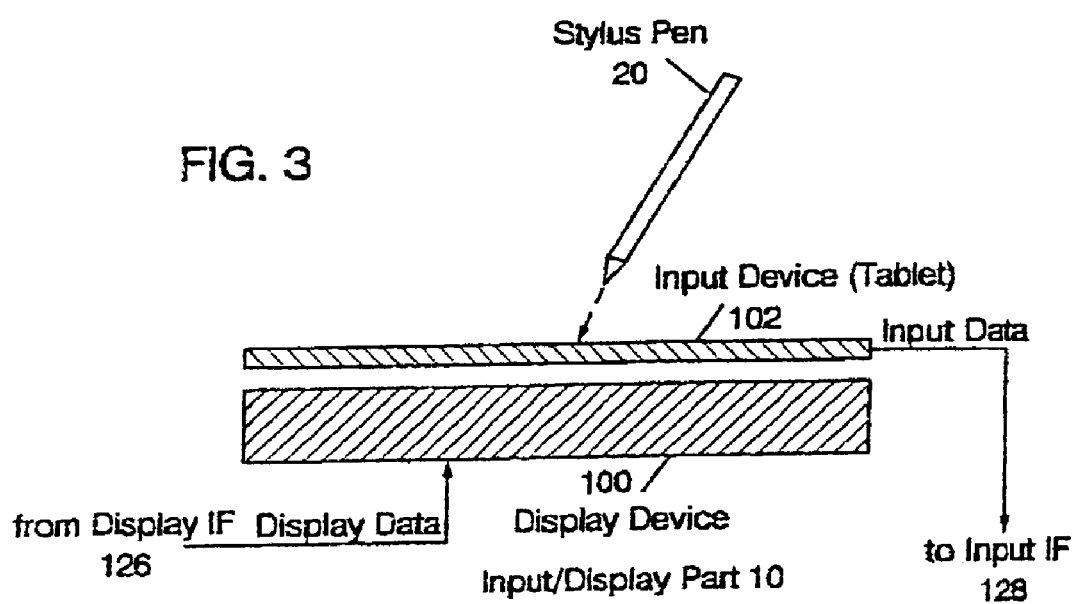
FIG. 3 shows an input/display portion of the PDA of FIGS. 1 and 2.

Referring to FIG. 3, the input/display part 10 comprises a display device 100 such as an LCD display device (liquid crystal display device) or a plasma display device and an input device 102, which is attached to the display face of the display device 100 and through which the display of the display device 100 is transmitted to the user. The input device 102 is typically a thin and transparent tablet. The data processing part 12 may be additionally provided with other components such as a hard disk device, a floppy disk device or a CD-ROM or the like for the storing software and data on a recording medium.

The display IF 126 outputs display data which is generated by the microprocessor 120 (FIG. 2) to the display device 100 of the input/display part 10. The input IF 128 outputs data input from the input device 102 of the input/display part 10 to the microprocessor 120 (FIG. 2). Referring to FIG. 2, the external if 130 outputs external data input from an external device (not shown) connected to the PDA apparatus 1 to the microprocessor 120 or external data inputted from the microprocessor 120 to the external device. In the input/display part 10 (FIG. 1), the display device 100 displays display data which is input from the microprocessor 120 via the display IF 126 for presentation to the user. The input device 102 (FIG. 3) sequentially detected coordinates of positions to which the user has pointed by using the stylus 20 and the like to generate input data indicating the detected coordinates and outputs them to the microprocessor 120 via the input IF 128.

With these components, the PDA apparatus 1 displays an operating screen for the user in the input/display part 10 and, when the user points to a predetermined position or range in the screen or hand writes a character with a stylus 20, performs a process corresponding to such manipulation. Such a method of inputting data and making selections on a screen means that the operation of the PDA apparatus 1 is very simple and intuitive and hence easy to use.

Currently, to switch on and start using a PDA apparatus 1 requires two separate actions to be completed by a user. The first is to press an on/off button in order to apply power to the PDA apparatus 1. The second is to remove the stylus 20 from the stylus storage location 24. Similarly, when powering the PDA apparatus 1 off, a further two separate actions are required (or at least desired), firstly the on/off button must be pressed again to remove power from the PDA apparatus 1, and secondly the stylus 20 must be replaced in the stylus storage location 24.

The present invention removes the requirement from the user to perform two operations to switch on and start using a PDA apparatus 1 and also to perform two operations to power off a PDA apparatus 1. The present invention adds significance to the gestures of "removing stylus" and "replacing stylus" thus making the PDA easier to use. The significance that is added to these gestures is summarized in the table below.

| Gesture | Significance | Reasoning |
| --- | --- | --- |
| "remove stylus" | Power on the PDA apparatus (identical to a "Power on" gesture) | user is likely to start using the PDA apparatus |
| "stylus absent" | increase the time out for the automatic power off of the PDA apparatus | user is still using the PDA apparatus |
| "replace stylus" | reset the time out for automatic power off to the default value | user is finished with the PDA apparatus, but may still be viewing information on the display screen |

Adding these significance to the gestures make the PDA apparatus 1 more user-friendly and more intuitive to user, and also makes the PDA apparatus 1 more energy efficient. Adding the "remove stylus" gesture may improve the PDA apparatus 1 performance as perceived by the user.

In an alternative embodiment, a similar, but less elegant, feature is implemented mechanically. The two actions needed to be performed by a user are linked mechanically to reduce them to one and a half actions from the view point of a user. The power on off button is linked to the stylus storage location 24. When the power on off button is pressed to power on the PDA apparatus 1, a locking mechanism within the stylus storage location 24 is released, thus allowing the stylus 20 to spring free in preparation for the user to start using the PDA apparatus 1. This improves the user friendliness of the new PDA apparatus 1 by making it immediately obvious to a new user where the stylus 20 is located once the device is powered on.

While the preferred embodiments of the present invention have been described here in detail, it will be clear to those skilled in the art that many variations are possible without departing from the spirit and scope of the present invention.

What is claimed is:

1. A notebook computer comprising:
   a display screen adapted to interact with a stylus;
   a storage location for storing the stylus when the stylus is not in use; and
   a power controller which powers on the notebook computer upon removal of the stylus from the storage location and which powers off the notebook computer upon replacement of the stylus into the storage location;
   wherein the power controller resets a time-out for automatic power-off of the notebook computer to a default value upon replacement of the stylus into the storage location.

2. The computer of claim 1 wherein the power controller increases a time-out for automatic power-off of the notebook computer whilst the stylus is removed from the storage location.

* * * * *